United States Patent
Garrison et al.

(10) Patent No.: US 12,301,416 B2
(45) Date of Patent: *May 13, 2025

(54) CLOUD PORTAL SYSTEM FOR MANAGING NETWORKING AND COMPUTING EQUIPMENT BY GENERATING CONTEXTUAL GUIDES SPECIFIC TO AFFECTED RESOURCE(S)

(71) Applicant: Cisco Technology, Inc., San Jose, CA (US)

(72) Inventors: Daniel Robert Garrison, San Jose, CA (US); Brian Sarbin, Belmont, CA (US); Ali Ebtekar, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/354,011

(22) Filed: Jul. 18, 2023

(65) Prior Publication Data

US 2023/0362054 A1      Nov. 9, 2023

Related U.S. Application Data

(63) Continuation of application No. 17/395,167, filed on Aug. 5, 2021, now Pat. No. 11,777,799.

(Continued)

(51) Int. Cl.
   *H04L 41/0816*      (2022.01)
   *G06Q 10/0639*     (2023.01)
   (Continued)

(52) U.S. Cl.
   CPC ..... *H04L 41/0816* (2013.01); *G06Q 10/0639* (2013.01); *H04L 41/0886* (2013.01);
   (Continued)

(58) Field of Classification Search
   CPC . H04L 41/0816; H04L 41/0886; H04L 41/14; H04L 47/762; H04L 47/781; H04L 47/827; G06Q 10/0639
   See application file for complete search history.

(56) References Cited

U.S. PATENT DOCUMENTS

| | | | |
|---|---|---|---|
| 11,777,799 B2 * | 10/2023 | Garrison | H04L 41/0816 |
| | | | 709/226 |
| 2006/0031934 A1 * | 2/2006 | Kriegel | G06F 11/2294 |
| | | | 726/25 |

(Continued)

OTHER PUBLICATIONS

Capterra Incorporated: "Customer Experience Software," 3 Pages, [Retrieved on Jun. 24, 2021] Retrieved from URL: https://www.capterra.com/sem-compare/customer-experience-software/.

(Continued)

*Primary Examiner* — Jeong S Park
(74) *Attorney, Agent, or Firm* — Edell, Shapiro & Finnan, LLC

(57) ABSTRACT

Methods are provided in which a computing device obtains, from one or more disparate data sources, inventory data of a plurality of network resources in a plurality of domains of an enterprise network. The inventory data includes configuration information of the enterprise network. The method further includes the computing device selecting one or more contextual insights that apply to the inventory data of the enterprise network from contextual information related to one or more networks and configuration of the one or more networks and generating one or more contextual guides specific to one or more affected network resources of the enterprise network based on the one or more contextual insights.

20 Claims, 13 Drawing Sheets

Related U.S. Application Data

(60) Provisional application No. 63/128,463, filed on Dec. 21, 2020.

(51) Int. Cl.

| | | |
|---|---|---|
| *H04L 41/08* | (2022.01) | |
| *H04L 41/14* | (2022.01) | |
| *H04L 47/70* | (2022.01) | |
| *H04L 47/762* | (2022.01) | |
| *H04L 47/78* | (2022.01) | |

(52) U.S. Cl.
CPC ............ *H04L 41/14* (2013.01); *H04L 47/762* (2013.01); *H04L 47/781* (2013.01); *H04L 47/827* (2013.01)

(56) References Cited

U.S. PATENT DOCUMENTS

| | | | |
|---|---|---|---|
| 2010/0235738 A1 | 9/2010 | Kodha et al. | |
| 2010/0257132 A1* | 10/2010 | Collard | G06Q 10/06 709/224 |
| 2013/0006408 A1 | 1/2013 | Zakrzwski et al. | |
| 2013/0066687 A1* | 3/2013 | Dewangan | G06Q 10/00 705/7.39 |
| 2014/0053146 A1* | 2/2014 | Freiter | G06Q 30/0631 717/170 |
| 2015/0019700 A1 | 1/2015 | Masterson et al. | |
| 2016/0189082 A1 | 6/2016 | Garrish et al. | |
| 2016/0253046 A1 | 9/2016 | Garrison et al. | |
| 2016/0253078 A1 | 9/2016 | Ebtekar et al. | |
| 2016/0254968 A1 | 9/2016 | Ebtekar et al. | |
| 2016/0283947 A1* | 9/2016 | Yip | G06Q 50/01 |
| 2016/0307219 A1 | 10/2016 | Hsu et al. | |
| 2017/0364561 A1 | 12/2017 | Wu et al. | |
| 2019/0147412 A1 | 5/2019 | Chiaramonte et al. | |
| 2019/0188737 A1 | 6/2019 | Asenjo et al. | |
| 2019/0212901 A1 | 7/2019 | Garrison et al. | |
| 2019/0265971 A1 | 8/2019 | Behzadi et al. | |
| 2019/0266762 A1 | 8/2019 | Ebtekar et al. | |
| 2019/0294477 A1 | 9/2019 | Koppes et al. | |
| 2019/0361720 A1 | 11/2019 | Balachandran | |
| 2020/0193311 A1 | 6/2020 | Myers et al. | |
| 2020/0322181 A1* | 10/2020 | Borle | H04L 12/4633 |
| 2021/0019133 A1 | 1/2021 | Rusev et al. | |
| 2021/0035186 A1* | 2/2021 | Koch | G06F 17/18 |
| 2021/0081189 A1 | 3/2021 | Nucci et al. | |
| 2021/0089987 A1 | 3/2021 | Mayer et al. | |
| 2021/0120023 A1 | 4/2021 | Gupta et al. | |
| 2021/0224124 A1 | 7/2021 | Barsalou et al. | |
| 2021/0295346 A1 | 9/2021 | Venkataraman et al. | |
| 2021/0312351 A1* | 10/2021 | Pourmohammad | G06F 16/906 |
| 2021/0406729 A1 | 12/2021 | Arias | |
| 2022/0148021 A1 | 5/2022 | Wilson | |

OTHER PUBLICATIONS

G2: "Oracle Customer Experience (CX) Cloud Suite," Sales Platforms, Retrieved on Jun. 24, 2021, 22 Pages.

Gainsight: "Customer Lifecycle Management," 2 Pages, [Retrieved on Aug. 5, 2021] Retrieved from URL: https://www.gainsight.com/your-success/customer-lifecycle-management/.

McKinsey & Company: "How We Help Clients: Customer Lifecycle Management," 8 Pages, [Retrieved on Aug. 5, 2021] Retrieved from URL: https://www.mckinsey.com/business-functions/marketing-and-sales/how-we-help-clients/customer-lifecycle-management#.

Salesforce: "From Lead to Loyal: Creating Engagement Through Effective Customer Lifecycle Management," 6 Pages, [Retrieved on Aug. 5, 2021] Retrieved from URL: https://www.salesforce.com/products/marketing-cloud/best-practices/customer-lifecycle-management/.

\* cited by examiner

● High
Security Advisory — 702
CVE: aaa.bbb
CVSS Score:
Base 7.0
Version 1.1
State: Active Published: Feb 3, 2020 (5 months ago)
Updated: Jun 11, 2020 (1 month ago)
Bug IDs: cccc Acknowledge — 704

| SUMMARY — 706 | AFFECTED ASSETS (4) — 708 | POTENTIALLY AFFECTED ASSETS (6) — 710 |

The list of assets known to be affected by this security advisory. Expand to view the details.
Showing 1-4 of 4 affected assets Export to CSV — 716

| Asset Name ▼ 714a | IP Address 714b | Product ID 714c | Software Release 714d | ... 714n |
|---|---|---|---|---|
| {asset name} | {ip address} | {product id} | {software release} | |

AFFECTED REASONS — 720
✓ Matched on Software Type
✓ Matched on Software Release
✓ Matched on Configured Features:
  - Auto Negotiation for Ethernet Interfaces
  - NSF/SSO (Nonstop forwarding with Stateful switchover)
ADDITIONAL NOTES — 722
Confirm an access control list (ACL) on an SNMP community to filter incoming SNMP requests to ensure that SNMP queries are performing only by trusted SNMP clients.

712a

| > | {asset name} | {ip address} | {product id} | | |
| > | {asset name} | {ip address} | {product id} | Acknowledge for this asset | ... 718 |
| > | {asset name} | {ip address} | {product id} | {software release} | |
|   |             |              |              | Mark as active for this asset | ... |

CLOUD PORTAL SYSTEM FOR MANAGING NETWORKING AND COMPUTING EQUIPMENT BY GENERATING CONTEXTUAL GUIDES SPECIFIC TO AFFECTED RESOURCE(S)

CROSS-REFERENCE TO RELATED APPLICATION

This application is a continuation application of U.S. 17/395,167 filed on Aug. 5, 2021, now U.S. Pat. No. 11,777,799, which claims the benefit of priority under 35 U.S.C. § 119(e) to U.S. Provisional Patent Application No. 63/128,463, entitled "CUSTOMER SERVICE CLOUD PORTAL SYSTEM," filed on Dec. 21, 2020, which are hereby incorporated by reference in their entireties.

TECHNICAL FIELD

The present disclosure relates to computer networks and systems.

BACKGROUND

Enterprise service functions for equipment and software can be burdensome and inefficient. This is particularly the case for enterprises that have large networks or systems of numerous instances and types of equipment and software. Tracking performance and troubleshooting issues with networking or other types of equipment and software in large networks is time consuming.

BRIEF DESCRIPTION OF THE DRAWINGS

FIG. 7 is a screen shot illustrating affected assets of a security advisory, according to an example embodiment.

FIG. 8 is a screen shot illustrating potentially affected assets of a security advisory, according to an example embodiment.

FIG. 11 is a screen shot illustrating an individual asset level view of contextualization, according to an example embodiment.

DESCRIPTION OF EXAMPLE EMBODIMENTS

Overview

Briefly, methods are presented for aggregating disparate cross-domain data related to enterprise network/computing system behavior, equipment telemetry, enterprise data, and a knowledge base into contextual guides that include advisories and supporting material specific to various aspects of an enterprise network.

In one example, a method is provided that includes obtaining, from one or more disparate data sources, inventory data of a plurality of network resources in a plurality of domains of an enterprise network. The inventory data includes configuration information of the enterprise network. The method further involves selecting one or more contextual insights that apply to the inventory data of the enterprise network from contextual information related to one or more networks and configuration of the one or more networks. The method then includes generating one or more contextual guides specific to one or more affected network resources of the enterprise network based on the one or more contextual insights.

EXAMPLE EMBODIMENTS

Figure 1:
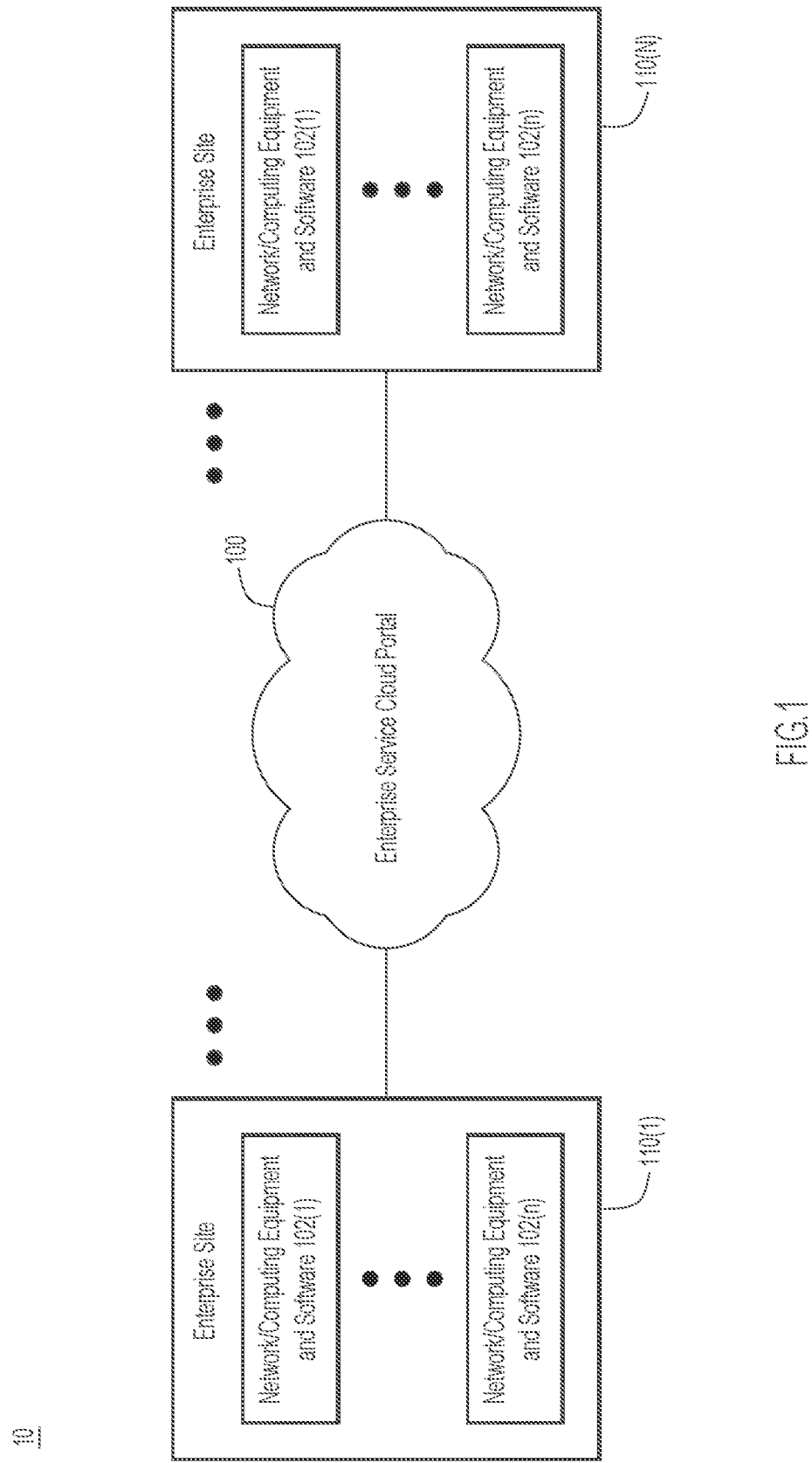
FIG. 1 is a block diagram of a system that includes an enterprise service cloud portal that interacts with network/computing equipment and software residing at various enterprise sites, according to an example embodiment.

FIG. 1 is a block diagram of a system 10 that includes an enterprise service cloud portal (cloud portal) 100 that interacts with network/computing equipment and software 102(1)-102(N) residing at various enterprise sites 110(1)-110(N), or in cloud deployments of an enterprise, according to an example embodiment.

The network/computing equipment and software 102(1)-102(N) are resources or assets of an enterprise (the terms "assets" and "resources" are used interchangeably herein). The network/computing equipment and software 102(1)-102(N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (PoD), and software such as system software (operating systems), firmware, security software such as firewalls, and other software products. Associated with the network/computing equipment and software 102(1)-102(N) is configuration and feature related information (configuration data) representing various configurations, such as enabled and disabled features. The network/computing equipment and software 102(1)-102(N), located at the enterprise sites 110(1)-110(N), represent information technology (IT) environment of an enterprise.

The enterprise sites 110(1)-110(N) may be physical locations such as one or more data centers, facilities, or buildings located across geographic areas that are designated to host the network/computing equipment and software 102(1)-102(N). The enterprise sites 110(1)-110(N) may further include one or more virtual data centers, which are a pool or a collection of cloud-based infrastructure resources specifically designed for enterprise needs, and/or for cloud-based service provider needs.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise when needed. Examples of capabilities include assets and coverage, advisories, cases (errors or issues to troubleshoot), automation workbench, insights, and so on. The cloud portal 100 threads data from multiple disparate sources into a contextualized digital representation of the enterprise's IT environment via a portfolio of hardware/software assets and services from one or more providers.

The cloud portal 100 may be executed by one or more computing devices, such as servers.

Figure 2:
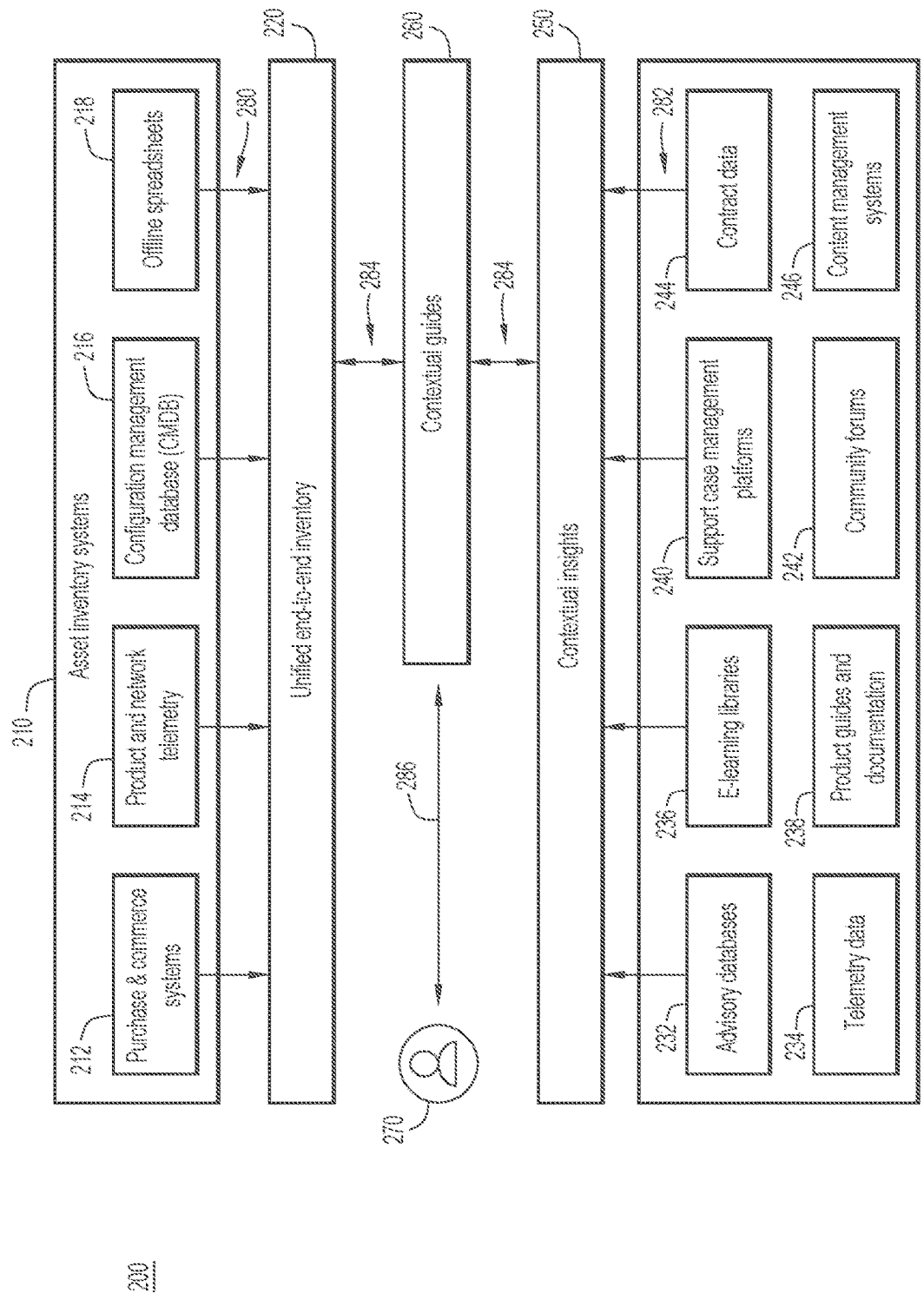
FIG. 2 is a high-level architecture diagram for generating contextual guides for managing equipment and software in an enterprise, according to an example embodiment.

FIG. 2 is a high-level diagram illustrating an architecture 200 for generating contextual guides via data threading, according to an example embodiment. Reference is also made to FIG. 1 for purposes of the description of FIG. 2. The architecture 200 includes various entities including asset inventory systems 210 that produce a unified end-to-end inventory (inventory) 220, and data and information systems 230 that are used to generate contextual insights 250. The unified end-to-end inventory 220 and contextual insights 250 are used to generate contextual guides 260 that are provided to a network operator or a user 270.

The asset inventory systems 210 include various sources of inventory 220 of an enterprise. That is, a suite of data sources is integrated to present a unified view of the enterprise's assets or resources across numerous dimensions, domains, or enterprise sites 110(1)-110(N). The inventory 220 is a result of the threading and correlation of data across multiple disparate sources.

The sources include purchase and commerce systems 212, product and network telemetry 214, a configuration management database (CMDB) 216, and offline spreadsheets 218. The purchase and commerce systems 212 include purchase and contract data obtained from various commerce tools and subscription systems. The purchase and contract data may include contract details such as asset purchase date, warranty status and expiry, support coverage status and expiry. The product and network telemetry 214 may include telemetry data from cloud agents/collectors and underlying product telemetry for asset connectivity status, management controller, software type, software release, and configured features. The CMDB 216 may include configuration information for various enterprise assets. The offline spreadsheets 218 may include information about the assets such as models, location, and so on. These are just some examples of the various sources in the asset inventory systems 210. The types and number of sources depend on a particular deployment of an enterprise network.

The data and information systems 230 are knowledge databases that include various supporting materials that may be used to interpret the inventory 220. The data and information systems 230 may include advisory databases 232 (advisory information systems), telemetry data 234, electronic learning (e-learning) libraries 236 (online libraries), product guidance and documentation 238 (product or service guides and documentation), support case managements platforms 240, community forums 242, contract data 244, and content management systems 246.

The advisory databases 232 or the advisory information systems may be published by various service providers. The advisory databases 232 (the advisory information systems) may include security advisories, field notices, known bugs, published end of life milestones (e.g. end of sale, end of support) affecting one or more resource, and other notices or contextual alerts.

The telemetry data 234, obtained by a provider from various enterprises, includes software types, releases, typically enabled and disabled features and so on.

The e-learning libraries 236 (online libraries) include content provided by a hosted provider and/or a third party. The content may be free and premium (paid) content relating to one or more resources including live and on-demand videos, e-courses, learning labs, and so on.

The product guides and documentation 238 (product or service guides and documentation) includes configuration guides for the resources, deployment guides, user manuals, and other product documentation.

The support case management platforms 240 include support cases opened against one or more resources and an ability to contextually trigger generating a new support case via an asset/resource entitlement. The support cases are for various enterprises and indicate issues or difficulties that may be encountered with a particular asset (compatibility, feature configuration, and so on).

The community forums 242 include popular and useful community forum posts relating to one or more resources such as hardware product type or software type/release.

The contract data 244 provides information about warranty coverages and/or support available for various hardware or software.

The content management systems 246 includes both free and premium (paid) support and training content relating to one or more resources such as ask an expert webinars, accelerator one-on-one coaching sessions, customized group training sessions and so on.

The contextual insights 250 are generated using supporting material from the data and information systems 230. The contextual insights 250 are analytics data that improves understanding of one or more aspects or issues in an enterprise network and include supporting materials and advisories with respect to the inventory 220. By way of an example, the contextual insights 250 may identify a network problem or a troubleshooting issue, one or more reasons for the network problem, and possible remediation actions.

The architecture 200 includes, at 280, the cloud portal 100 analyzing data in the asset inventory systems 210 to generate the inventory 220 of the enterprise. Specifically, the cloud portal 100 analyzes the telemetry data, the configuration data, and the service related information from a subscription system to generate the inventory 220. The inventory 220 includes information about the network/computing equipment and software 102(1)-102(N) at the enterprise sites 110(1)-110(N). The inventory 220 includes data related to identification, location, configurations, descriptions, and so on for each resource or asset of the enterprise. The inventory 220 is resource information aggregated from the enterprise sites 110(1)-110(N) that represent the IT environment of the enterprise, including hardware, software, and services provided by various service providers.

At 282, the cloud portal 100 extracts relevant support material (e.g., product support information) or content (contextual alerts) from the data and information systems 230. The relevant support material applies to the one or more resources in the inventory 220 to form the contextual insights 250.

At 284, the cloud portal 100 generates contextual guides 260 based on the inventory 220 and the contextual insights 250. For example, contextual guides 260 may include an identification of one or more affected resources (a particular piece of network equipment from among the one or more network/computing equipment and software 102(1)-102 (N)), identification of a respective one or more domains from the enterprise sites 110(1)-110(N), where the affected resource is located, and the applicable contextual insight. An example of a contextual insight may be that the affected resource needs to be upgraded to a newly released version of an operating system.

At 286, the contextual guides 260 are then output, via a display, to the user 270. In one example embodiment, the contextual guides 260 are used to reconfigure the affected resource, either automatically or based on confirmation from the user 270.

Figure 3:
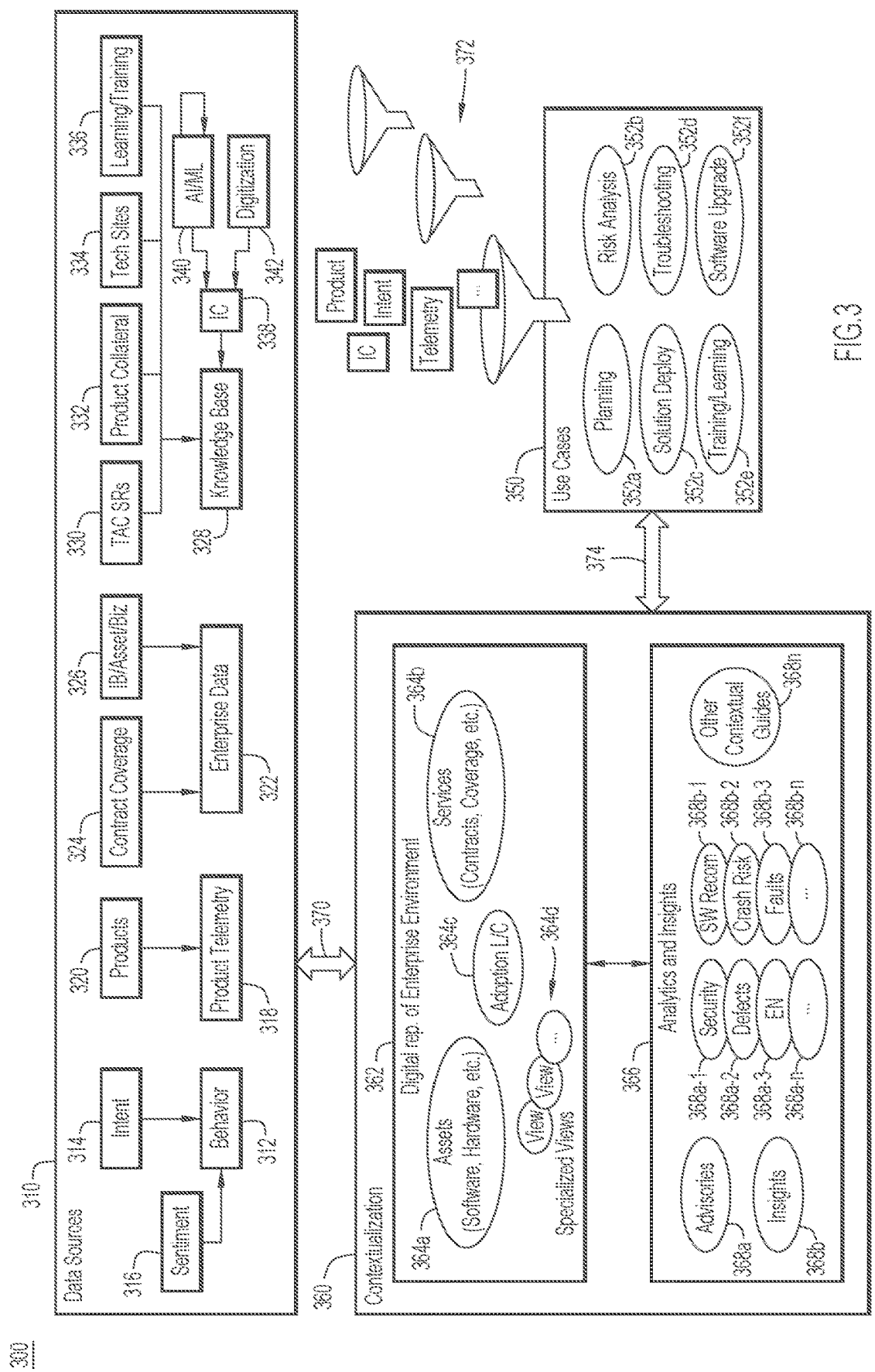
FIG. 3 is a detailed system architecture diagram for managing enterprise resources, according to an example embodiment.

FIG. 3 is a detailed system architecture diagram 300 of the cloud portal 100 in connection with its operations for managing enterprise resources, according to an example embodiment. Reference is also made to FIGS. 1 and 2 for purposes of the description of FIG. 3. The cloud portal 100 obtains inventory data and supporting content from data sources 310, applies use cases 350, and forms a contextualization 360.

The data sources 310 include an enterprise behavior 312 generated based on an enterprise's intent 314 and sentiment 316. The enterprise behavior 312 represents patterns of use and enterprise for its network/computing equipment and software 102(1)-102(N), at various enterprise sites 110(1)-110(N) such as implement latest technology or maintain current version for as long as possible.

The data sources 310 further include product telemetry 318 obtained by monitoring products 320, such as the network/computing equipment and software 102(1)-102(N) of the enterprise. The product telemetry 318 may include operational states, updates and configuration related data, faults, errors, etc.

The data sources 310 further include enterprise data 322 obtained from enterprise contracts 324 or service related information such as purchase contracts, service contracts, and warranty service agreements (obtained from a subscription system), and asset information 326 that may include data about network/computing equipment and software 102(1)-102(N), at various enterprise sites 110(1)-110(N). The enterprise behavior 312, the product telemetry 318 and enterprise data 322 are another example of the asset inventory systems 210 of FIG. 2.

The data sources 310 further include a knowledge base 328, which is another example of the data and information systems 230 of FIG. 2. The knowledge base 328 includes contextual information (support material) from a technical assistance center (TAC) service requests (SRs) 330, product collateral 332, such as instruction manuals and user manuals (product or service guides and documentation), technical sites 334, learning and training materials 336 (online libraries), and intellectual capital (IC) 338 generated based on artificial intelligence (AI)/machine learning (ML) 340 and digitization 342 associated with product cases/issues. The IC 338 provides for integrated insights and analytics on one or more resource across dimensions such as health/risk, stability, capacity, and aging.

The use cases 350 involve filtering the inventory data and supporting content from data sources 310 to generate contextual information specific to a particular use case scenario of an enterprise. The use cases 350 may include planning 352a, risk analysis 352b, solution deployment 352c, troubleshooting 352d, training and learning 352e, configuration update of the enterprise network (software upgrade) 352f, etc., that may be custom-generated depending on an enterprise, its resources, and networks.

The contextualization 360 involves generating digital representations 362 of the enterprise environment and providing analytics and insights 366 specific to the enterprise. Some examples of the digital representations 362 include a unified view of the enterprise assets 364a, services 364b, adoption life cycle (L/C) 364c, specialized views 364d, etc. The specialized views 364d represent distinct dimensions of the context, such as an aggregate representation of the L/C journey across all of the domains, use cases 350, and deployments, assets and coverage inventory and install base information, unified and normalized across the domains. A backend platform and data lake system may aggregate disparate sources of information to present these unified views relevant to the enterprise environment.

Some examples of the analytics and insights 366 include advisories 368a, insights 368b, and other contextual guides 368n. The advisories 368a may be subdivided into categories such as security advisories 368a-1, defects 368a-2, field notices (FN) 368a-3, and others 368a-n. The insights 368b may also subdivided into categories including software recommendations 368b-1, crash risks 368b-2, faults 368b-3, and others 368b-n. The digital representations 362 and analytics and insights 366 are detailed below.

At 370, the enterprise data and support content from the data sources 310 are threaded to provide the contextualization 360. For example, the digital representation 362 of the enterprise IT environment is generated based on purchased portfolio of hardware/software assets and services from one or more providers obtained from the enterprise data 322 of the data sources 310. Specifically, the telemetry data, the configuration data from a configuration management database, and service related information from the subscription system is analyzed to generated the unified inventory that represents the enterprise IT environment.

At 372, the enterprise data and content from the data sources 310 are filtered to only include data and content relevant to a particular use case from the use cases 352a-n.

At 374, the contextualization 360 is generated to provide a particular one of the specialized views 364d, a particular advisory or a security alert from the advisories 368a-1-368a-n or a particular insight or a contextual alert from the insights 368b-1-368b-n.

The contextualization 360 may be hierarchical. In one example embodiment, the contextualization 360 is presented in a 2- or 3-layer hierarchy. Each layer has its own unique substructure. The first layer represents organizational intent and business outcome of the solution. The second layer includes key aspects or facets of the solution. The third layer is a collection of threaded data structures representing significant properties and characteristics of the selected facet. The contextualization 360 ensures the information of the enterprise environment is presented timely and is relevant and useful.

Figure 4:
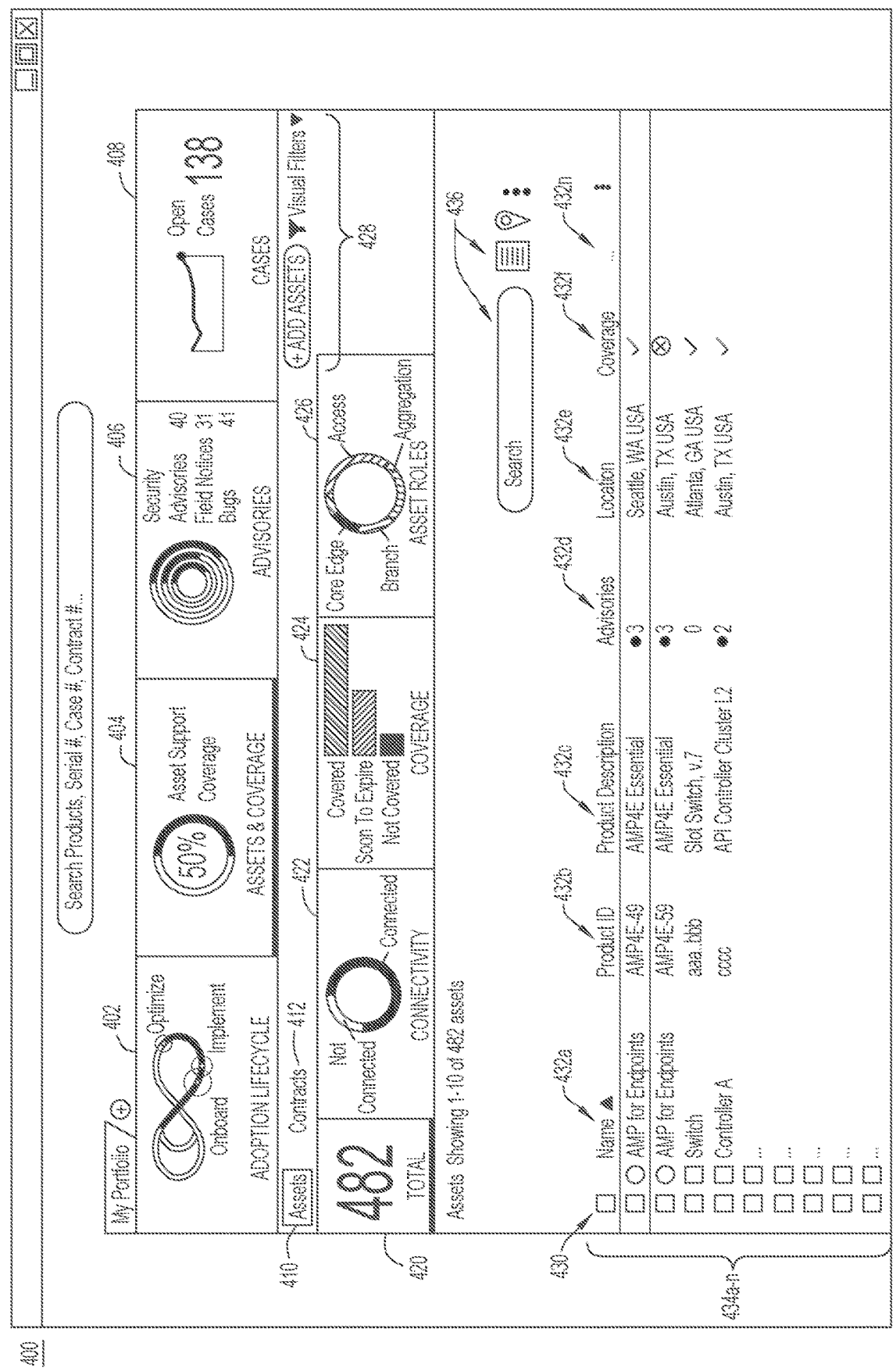
FIG. 4 is a screen shot illustrating a high-level view of contextualization of network resources of an enterprise, according to an example embodiment.

FIG. 4 is a screen shot illustrating a high-level view 400 or unified view of the enterprise assets 364a of FIG. 3, according to an example embodiment. The cloud portal 100 contextualizes the data sources 310 to generate the high-level view 400, referred to as "My Portfolio."

The high-level view 400 shows assets and coverage aggregated from various domains (enterprise sites 110(1)-110(N) of FIG. 1). At various levels of context selection included in the high-level view 400, the assets and coverage (along with content in the other facets and views) is shown across all of the enterprise domains. For a user or a network operator logging in without any active access control restrictions, the high-level view 400 represents a holistic, cross-domain view of the enterprise hardware/software assets and services purchased from various providers. In the event the user's view is limited by access control policies, the high-level view 400 encompasses the top-most aggregation of all domains and assets/services that the user is permitted to view. The high-level view 400 includes various facets of an enterprise network, such as an adoption lifecycle facet 402, an asset and coverage facet 404, an advisories facet 406, and cases facet 408.

The adoption lifecycle facet 402 involves a system for visualizing, presenting, and tracking the status (hybrid vendor/enterprise/telemetry based input) of an enterprise adoption journey with their purchased technology, with integrated learning and support content/resources embedded in context of the enterprise's current/future guided adoption tasks. This informs the enterprise where they are on the adoption journey, as well as next steps, based on telemetry and insights.

The asset and coverage facet 404 is selected in the high-level view 400, as an example, and includes an assets category 410 and a contacts category 412. The assets category 410 shows the total number of assets 420 aggregated across various domains, such as enterprise sites 110(1)-110(N), a number of connected assets 422, an asset coverage 424 such as warranty and/or technical support, assets for which the warranty is soon to expire, and assets not covered by any warranty, and asset roles 426 such as access, aggregation, branch, core edge in this example scenario. Tools 428 provide for manipulation of the high-level view 400 and may include features such as "add an asset" and various display filters.

In the high-level view 400, the assets category 410 is selected and a list of assets 430 is displayed. For example, the list of assets 430 includes the asset name 432*a*, product identification 432*b*, product description 432*c*, number of available advisories or contextual insights 432*d*, location 432*e*, warranty coverage 432*f*, and other attributes 432*n*. The type of assets 434*a-n* are malware protection (AMP) for endpoints, other software products and hardware products such as network devices. The types and number of assets vary depending on a particular deployment scenario. Tools 436 provide for searching, filtering, and changing views of the assets 434*a-n*.

The advisories facet 406 is described below with reference to FIGS. 5-8.

The open cases facet 408 includes a number of support cases and/or open issues (troubleshooting) for the enterprise. The open cases facet 408 may include details about all cases or a particular group of cases specific to a particular context and/or use case scenario. The details may include severity, case numbers, title, description of actions taken, duration, status, owner, last update, and so on. The open cases facet 408 is shown in detail in FIG. 10.

Figure 5:
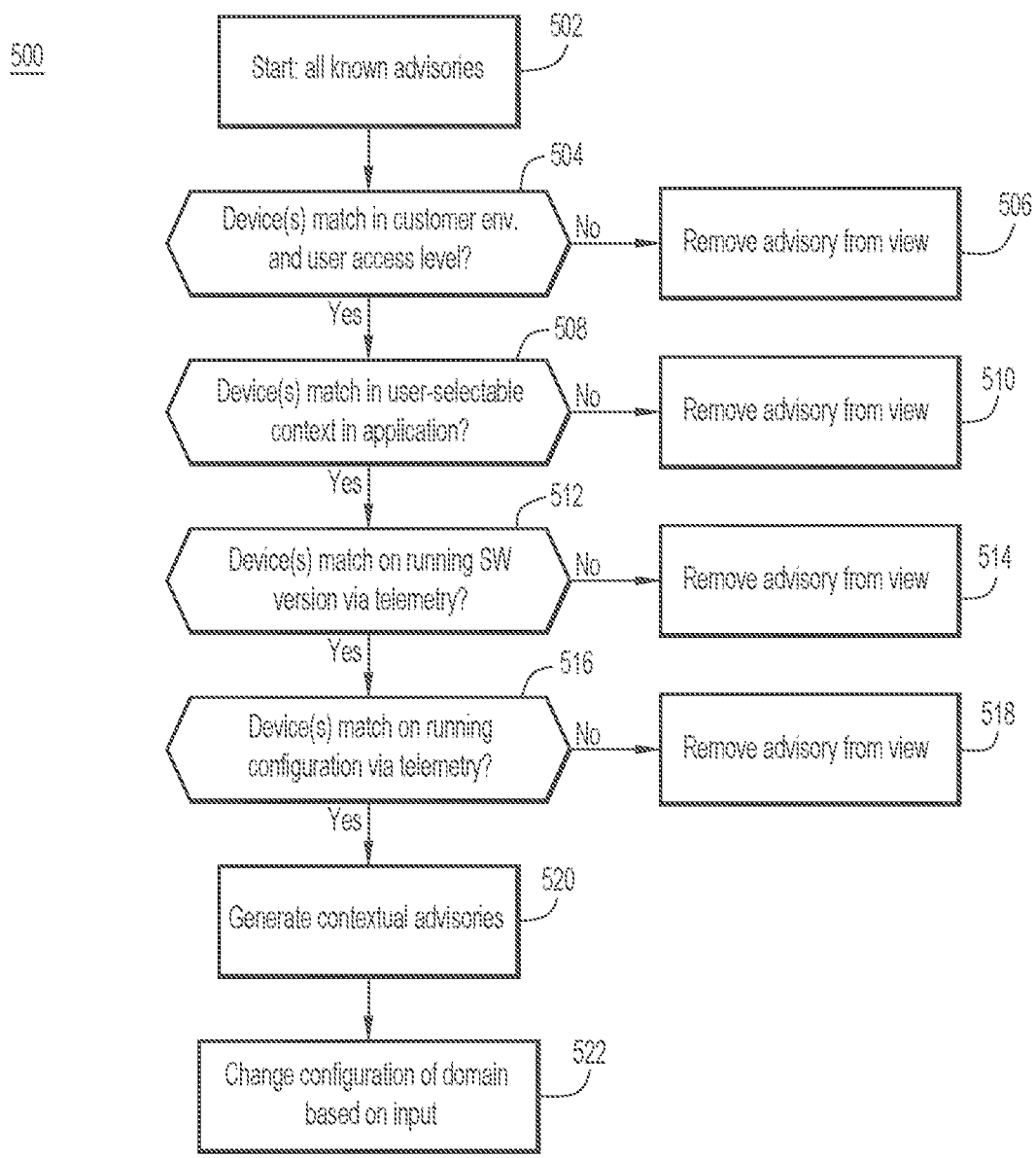
FIG. 5 is a flow diagram of a method for changing a configuration of at least one affected network resource in an enterprise based on one or more contextual advisories, according to an example embodiment.

FIG. 5 is a flow diagram illustrating a method 500 of changing a configuration of at least one affected network resource in an enterprise based on one or more contextual advisories, according to an example embodiment. The method 500 is performed by the cloud portal 100, which is executed by one or more computing devices.

The method 500 starts at 502, in which the cloud portal 100 obtains all known advisories (security alerts) from the data and information systems 230 of FIG. 2 and/or the knowledge base 328 of FIG. 3.

At 504, the cloud portal 100 determines which advisories apply to network resources of an enterprise (assets in the inventory 220 of FIG. 2). Optionally, the cloud portal 100 further determines which network resources of the enterprise to select based on a user access level. That is, the cloud portal 100 determines which network resources can be viewed and/or acted upon by the logged-in user and then selects advisories that apply to the determined network resources. Additionally or alternatively, the cloud portal 100 may determine which advisories would apply to the selected network resources based on a user access level. For example, if the logged-in user is a network troubleshooter, only troubleshooting related advisories are selected. On the other hand, if the user is a network administrator, all network related advisories are selected. In short, the cloud portal 100 may selected network resources and/or determine level of granularity (specific categories of advisories, specific types of content) based on access controls.

At 506, the cloud portal 100 discards advisories that do not apply to the network resources and the user access level, thereby generating a set of advisories specific to the inventory of the enterprise.

At 508, the cloud portal 100 determines whether the generated set of advisories matches user-selectable context in the cloud portal 100. By default, users may be provided with the high-level view 400 of FIG. 4 that represents the entire enterprise IT environment. The users may then select a particular area (context) of the IT environment using the specialized views 364*b-n* of FIG. 3 and/or based on a particular use case from the use cases 350 of FIG. 3. For example, the user selects to view the security domain, campus networking domain, or all enterprise sites within a particular geographic region.

At 510, the advisories that do not apply to the user-selectable context are discarded, thereby generating a first subset of advisories specific to the enterprise's network resources and the context.

At 512, the cloud portal 100 determines the software version of each affected network resource to which the first subset of advisories applies. The software version may be detected based on the product telemetry 318 of FIG. 3.

At 514, if the affected network resource is running a software version to which the advisory does not apply, the advisory is discarded, thereby generating a second subset of advisories.

At 516, the cloud portal 100 determines a configuration running on each affected network resource to which the second subset of advisories applies. The configuration may include disabled features and enabled features, determined based on the product telemetry 318 of FIG. 3.

At 518, if the advisory does not apply to the configuration of the affected network resource, the advisory is discarded, thereby generating a final subset of advisories that is specific to configuration of the affected network resources.

At 520, the cloud portal 100 generates one or more contextual advisories that identifies each of the affected resources, including a configuration that is impacted by a respective advisory from the final subset of advisories.

At 522, the cloud portal 100 changes the configuration of the one or more affected network resources based on the final subset of advisories, optionally with a confirmation from the user.

The final subset of advisories is specifically tailored to the enterprise network environment, and may include cross-domain data. The final subset of advisories is generated based on an awareness of: a) the enterprise resources, b) context, c) the versions of software the affected resources are running, and d) the features enabled on the affected resources. The final subset of advisories presented ensures that the enterprise has a targeted, relevant, and actionable set of issues to work from and address, resulting in significant time and effort savings. The enterprise need not manually monitor advisory bulletins or subscribe to general advisory email distributions or Really Simple Syndication (RSS) feeds, and analyze the total set of advisories to figure out which advisories impact their environment and which resources are effected and how.

Figure 6:
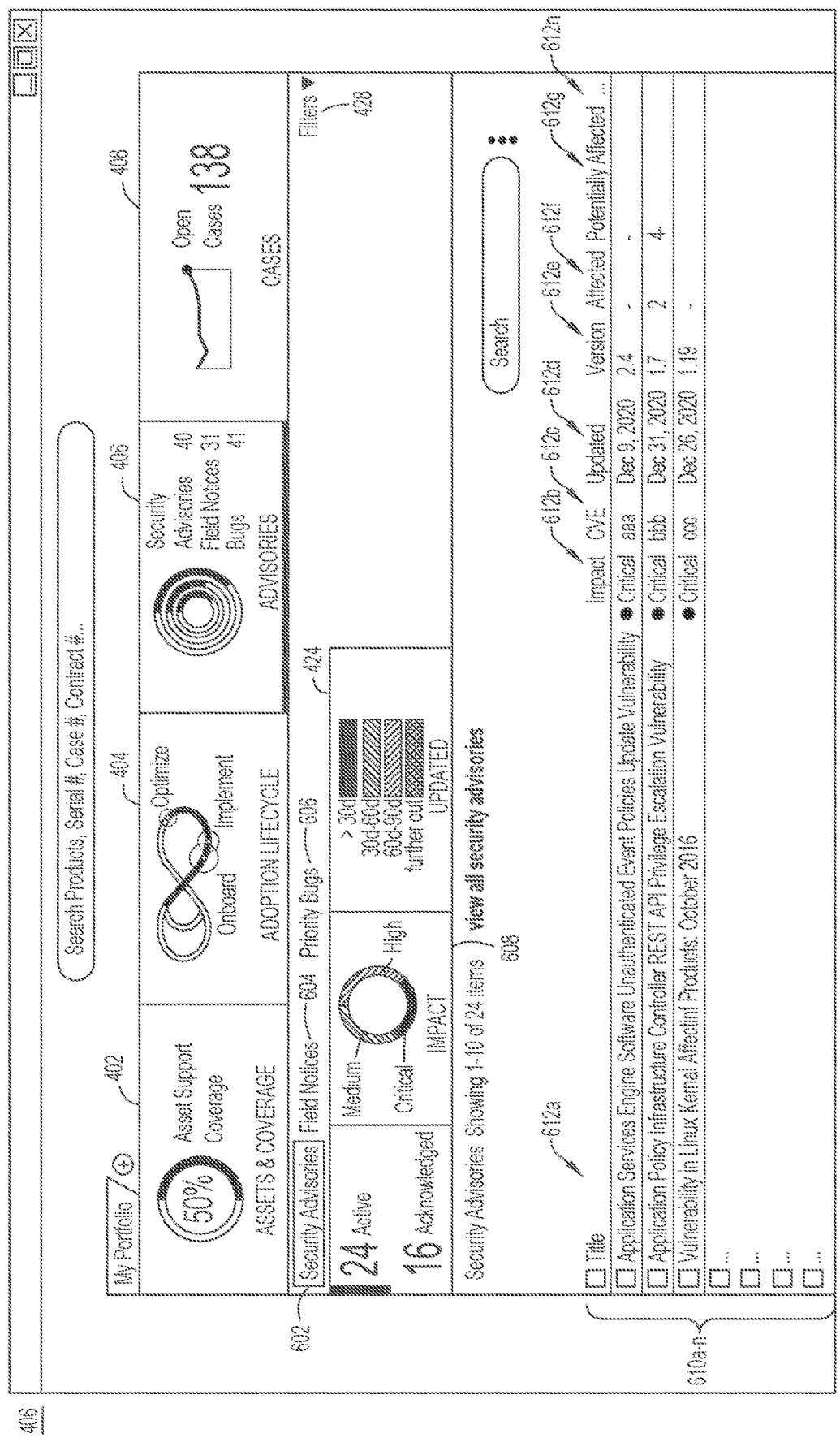
FIG. 6 is a screen shot illustrating an advisories view of the contextualization of the network resources of the enterprise, according to an example embodiment.

FIG. 6 is a screen shot illustrating the advisories facet 406 of FIG. 4, according to an example embodiment. The cloud portal 100 generates the advisories facet 406, which includes a security advisories portion 602, a field notices portion 604, and a bugs portion 606, according to one example deployment.

In the security advisories portion 602, a number of active advisories and acknowledged advisories are provided. These security advisories are examples of the contextual advisories generated at 520 in FIG. 5. The user may filter advisories based on context such as security advisories, general, and so on. Additional information 608 about the overall security advisories may also be provided, such as the overall impact of the advisories and various timestamps of the advisories as a whole.

A list of the security advisories 610a-n includes individual general information for each security advisory. The individual general information may include a title 612a, an impact 612b, common vulnerabilities and exposures (CVE) information 612c, a time stamp 612d such as the last update, a version 612e, a number of affected resources 612f, a number of potentially affected network resources (potentially affected resources) 612g, and other attributes 612n.

The security advisories portion 602 demonstrates one level of data threading from various backend systems and platforms such as the telemetry data from cloud agents/collectors and underlying product telemetry, IC engines, and advisory databases, described in FIGS. 2 and 3.

By selecting one of the security advisories 610a-n, the cloud portal 100 generates the next level of data that provides specific information about the selected security advisory.

FIG. 7 is a screen shot illustrating, for a selected security advisory 700, affected assets 712a-n, according to an example embodiment. The selected security advisory 700 includes some of the general information 702 about the selected security advisory 700 that may include its criticality, a CVE identification, a CVE score, version and state (active, acknowledged, implemented, inactive, and so on), date and bug identifiers. Additionally, advisory tools 704 to acknowledge the selected security advisory 700 may be provided, which would move the selected security advisory 700 to an acknowledged category in the security advisories portion 602 of FIG. 6.

The selected security advisory 700 includes a summary portion 706, an affected assets portion 708, and a potentially affected assets portion 710. The summary portion 706 includes advisory details or summary information that may be threaded from the data and information systems 230 (the e-learning libraries 236) of FIG. 2 and/or the knowledge base 328 (technical sites 334) of FIG. 3.

The affected assets portion 708 and the potentially affected assets portion 710 are specific to the enterprise and are generated based on the resources in the inventory 220.

The affected assets portion 708 includes the total number of affected assets (4) and information 714a-n about each of the affected assets 712a-n. The information 714a-n includes an asset name 714a, an IP address 714b and/or location of the asset such as the enterprise site 110(1), a product identification (ID) 714c, a software release 714d, and other attributes 714n. Manipulation tools 716 may provide for filtering the affected assets 712a-n based on various criteria and/or for exporting the list of affected assets 712a-n to a file (comma-separated values (CSV) file) such as the offline spreadsheets 218 of FIG. 2. Resource tools 718 may provide for acknowledging or dismissing the selected security advisory 700 for a particular asset.

By selecting one of the affected assets 712a-n such as the first asset 712a, the cloud portal 100 generates the next level of data that includes reasons 720 (explanation for applying the selected security advisory 700 to the first asset 712a) and additional notes 722 (actions or tasks to perform). In one example, the reasons 720 include that the asset matches the software type, software release, and configuration features. The reasons 720 may further include details about the software type, release, and configuration features that matched. The additional notes 722 may provide an action plan to fix the security vulnerability identified in the selected security advisory 700 such as confirm an access control list (ACL) on a Simple Network Management Protocol (SNMP) community to filter incoming SNMP requests to ensure that SNMP queries are performed only by trusted SNMP clients. Although not shown, action tools to perform the action plan may also be provided. By manipulating the action tools, the cloud portal 100 changes the configuration of the affected first asset 712a based on the action plan.

When the user selects the potentially affected assets portion 710, the cloud portal 100 outputs a list of the potentially affected assets.

Figure 8:
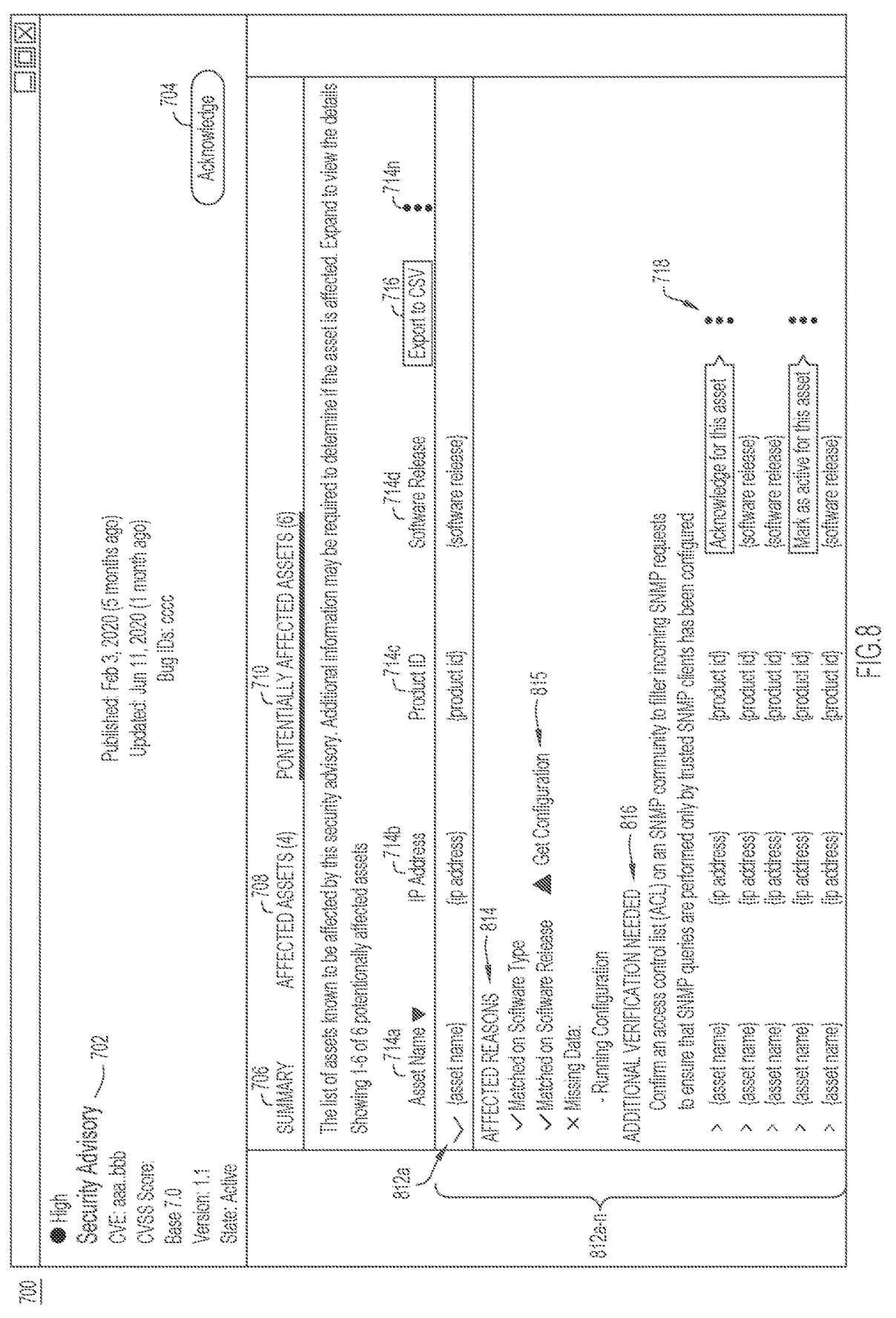

FIG. 8 is a screen shot illustrating potentially affected assets 812a-n of the selected security advisory 700, according to an example embodiment. When the user selects the potentially affected assets portion 710, the cloud portal 100 outputs a list of the potentially affected assets 812a-n, which may further include the total number of the potentially affected assets (6).

The affected assets portion 710 provides analogous general information 714a-n for the potentially affected resources 812a-n. This is just one use case scenario and the information may be different from the information 714a-n (include or exclude some of the attributes).

By selecting the first potentially affected asset 812a from the list of the potentially affected assets 812a-n, the cloud portal 100 generates the next level of data that includes reasons 814 or explanation why the selected security advisory 700 may potentially apply and additional notes 816 (action plan).

The reasons 814 include matched information and missing information to determine whether the first potentially affected asset 812a is an affected asset. For example, the first potentially affected asset 812a matches the software type and the software release but the configuration features are unknown. The cloud portal 100 could not locate the running configuration of the first potentially affected asset 812a. Missing data tools 815 may be provided to help the cloud portal 100 locate the missing data. For example, permission for the cloud portal 100 to access a configuration file of the first potentially affected asset 812a may be granted via the missing data tools 815 and the cloud portal 100 then collects the missing data to definitively classify the first potentially affected asset 812a as affected or not.

The additional notes 816 may identify the actions needed to fix the security vulnerability. For example, confirm an access control list (ACL) on a Simple Network Management Protocol (SNMP) community to filter incoming SNMP requests to ensure that SNMP queries are performed only by trusted SNMP clients. Although not shown, action tools to perform the needed actions may be provided. In other words, instead of definitively determining whether the first potentially affected asset 812a is affected or not, the user may try to perform the needed actions by manipulating the action tool.

Figure 9:
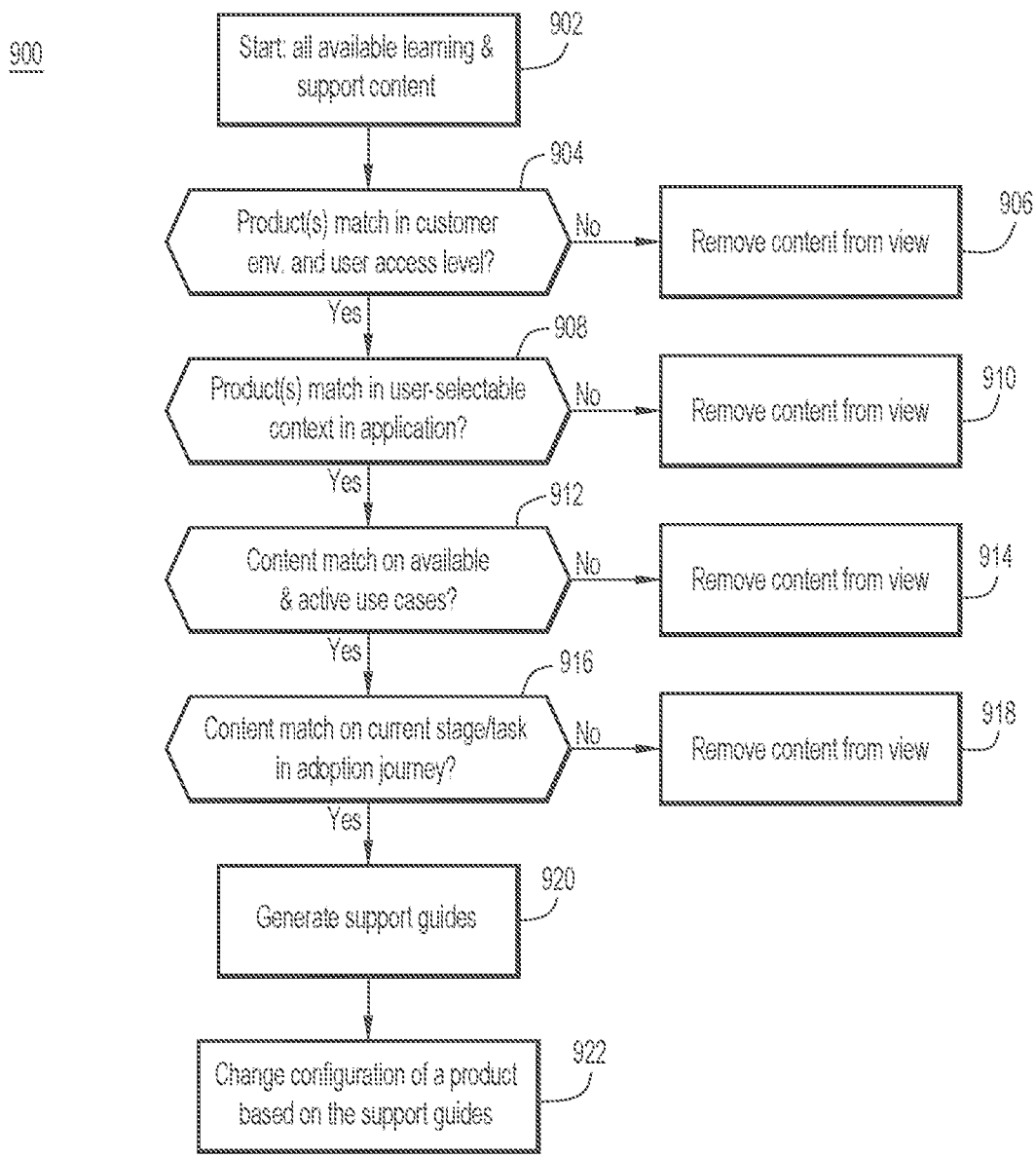
FIG. 9 is a flow diagram of a method for changing a configuration of at least one affected network resource in an enterprise based on one or more support guides, according to an example embodiment.

FIG. 9 is a flow diagram illustrating a method 900 of changing a configuration of at least one affected network resource in an enterprise based on one or more support guides, according to an example embodiment. The method 900 is performed by the cloud portal 100, which is executed by one or more computing devices. The method 900 refines and tailors the support material specific to the enterprise given the current context and a stage of adoption.

The method 900 starts at 902, in which the cloud portal 100 obtains all known supporting material or content (contextual alerts and product support information) from the data and information systems 230 of FIG. 2 and/or the knowledge base 328 of FIG. 3.

At 904, the cloud portal 100 determines which content applies to the network resources of an enterprise. That is, the cloud portal 100 selects support material (contextual data set) that applies to the assets in the inventory 220 of FIG. 2. Optionally, the cloud portal 100 uses access controls to select network resources from the network resources of the enterprise that the logged-in user can view and act upon and/or to select specific categories and type of content. For example, if the logged-in user is a network troubleshooter, only troubleshooting related content (troubleshooting contextual data set) is selected. On the other hand, if the user is a network administrator, all network related content (network related contextual data set) is selected.

At 906, the cloud portal 100 discards content that does not apply to the network resources and to the user access level, thereby generating a support material set specific to the network resources of the enterprise.

At 908, the cloud portal 100 determines whether the generated support material set matches user-selectable context in the cloud portal 100. By default, the users are provided with the high-level view 400 of FIG. 4 that represents the entire IT environment of the enterprise. The users may then select a particular area (context) using specialized views 364b-n of FIG. 3 and/or a particular geographic area or sites. For example, the user may select to view the security domain or the campus-network domain, or all enterprise sites within a particular geographic region.

At 910, the content that does not apply to the user-selectable context are discarded, thereby generating a first support material subset specific to the selected context.

At 912, the cloud portal 100 determines whether the first support material subset matches available and active use cases. The use cases are the outcomes that an enterprise is driving towards, and are obtained from the enterprise behavior 312 referred to above in connection with FIG. 3. The use cases provide the reasoning as to why the enterprise is using the technology, what capabilities are to be achieved, what the enterprise is to gain through the usage of this technology.

At 914, if content of the first support material subset does not match available and active use cases (the outcome the enterprise is trying to achieve), the content is discarded, thereby generating a second support material subset.

At 916, the cloud portal 100 determines if the content in the second support material subset matches a current stage (a particular stage) or task in an adoption lifecycle journey of the particular resource affected by the content. The adoption lifecycle may encompass the end-to-end journey stages such as: need, evaluate, select, align, purchase, onboard, implement, use, engage, adopt, optimize, recommend, advocate, and accelerate. Based on the stage in the adoption lifecycle, certain activities and a certain type of support materials are determined to be most relevant.

At 918, the content in the second support material subset that does not match the current stage (the particular stage) or task in the adaption journey is discarded, thereby generating a final support material subset that is specifically tailored to the enterprise network, context, use cases, and current stages in the adoption journey.

At 920, the cloud portal 100 generates one or more support guides that identifies affected resources of the enterprise network, including an affected configuration of the resources in their current stages.

At 922, the cloud portal 100 may change the configuration of the one or more network resources or products based on the support guides by performing one or more actions in the support guides, optionally, with a confirmation from the user.

Figure 10:
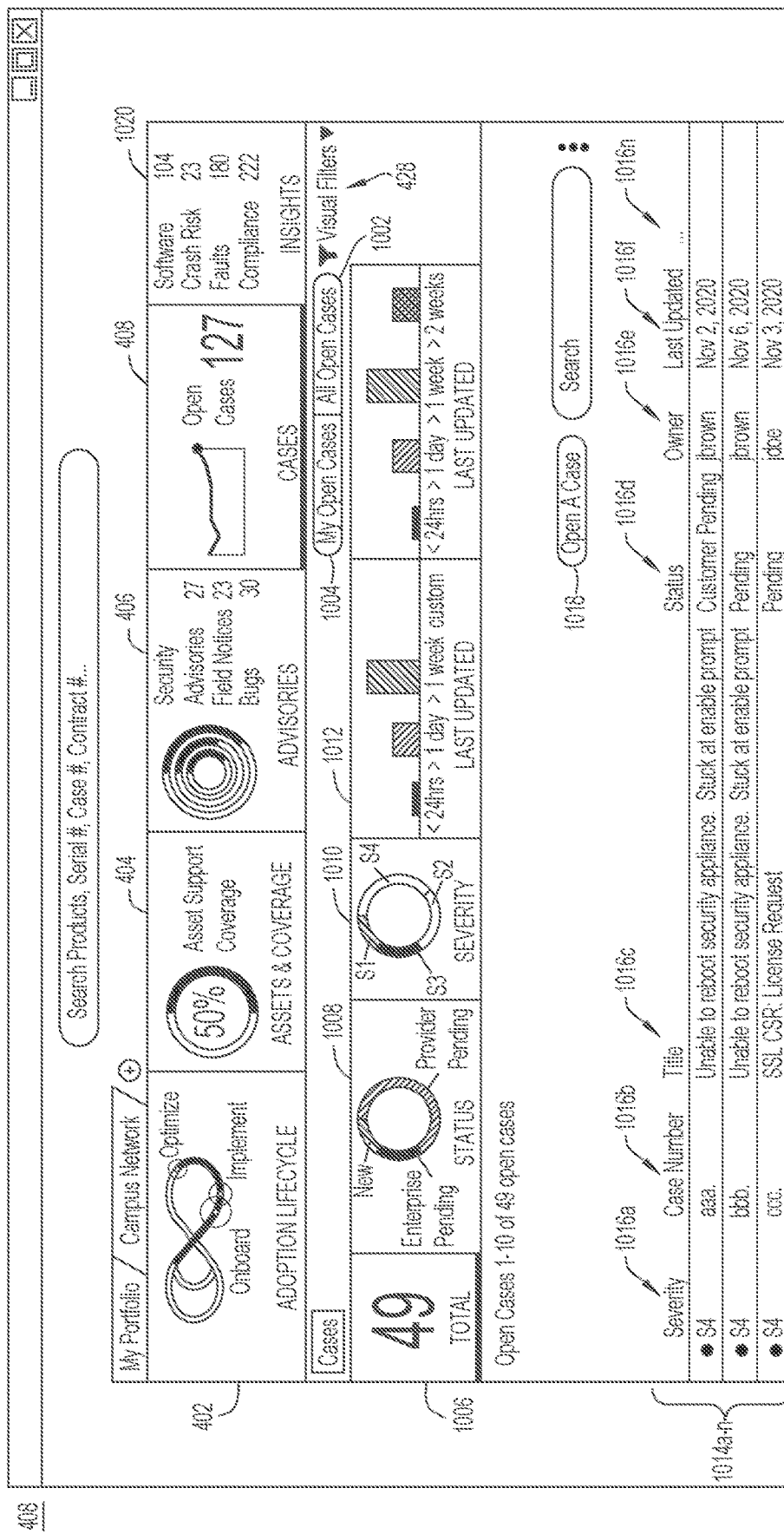
FIG. 10 is a screen shot illustrating a cases view of the contextualization of the network resources of the enterprise, according to an example embodiment.

FIG. 10 is a screen shot illustrating the cases facet 408 of the contextualization of the network resources of the enterprise, according to an example embodiment. The cloud portal 100 may generate another layer of contextualization with a user-selectable context for all views. The cases facet 408 represents all support cases across various enterprise sites 110(1)-110(N) of the enterprise IT environment, which the user is authorized to view. However, as the user selects a more specific context such as the Campus Network success track/domain, the context changes to render just the support cases applicable to assets within the Campus Network context. This same paradigm is easily extended to other ways the user may segment the enterprise network as a means of establishing context, including sites and pre-defined/user-defined asset groups.

The cases facet 408 shows that there are 127 open cases. The user may then select to view all open cases 1002 or open cases assigned to the user (my open cases) 1004. If the user selects to view my open cases 1004, the cloud portal 100 generates the next level of information about my open cases 1004 that includes the total number 1006 of open cases (forty nine cases), the collective status 1008 of the cases (pending with the provider, pending with the enterprise, new) and the collective severity 1010 of the my open cases 1004. The cloud portal 100 may further generate various time related graphs 1012 that show last updates and collective durations of the open cases, and so on. The cloud portal 100 generates a list of open cases 1014a-n and information about each that may include the severity 1016a, a case number 1016b, a title 1016c, a status 1016d, an owner 1016e (user assigned to the case), a time stamp (the last update) 1016f, and other information 1016n such as additional details about the open case and/or links to related support guides. The user may select a particular case to view the details of the case and the affected resources. Tools 1018 are further provided to generate a new case.

The cloud portal 100 may also render the support guides as insights 1020. The cloud portal 100 threads data from multiple sources into various contextualized representations derived from various combinations of purchase and contract data from commerce tools, telemetry data from cloud agents/collectors and underlying product telemetry, as well as inventory data sources provided by the enterprise through mechanisms such as automated CMDB uploads or manual asset entry. At the specific asset level, a suite of data sources is integrated, by the cloud portal 100, to present a unified view of the asset across numerous dimensions.

Figure 11:
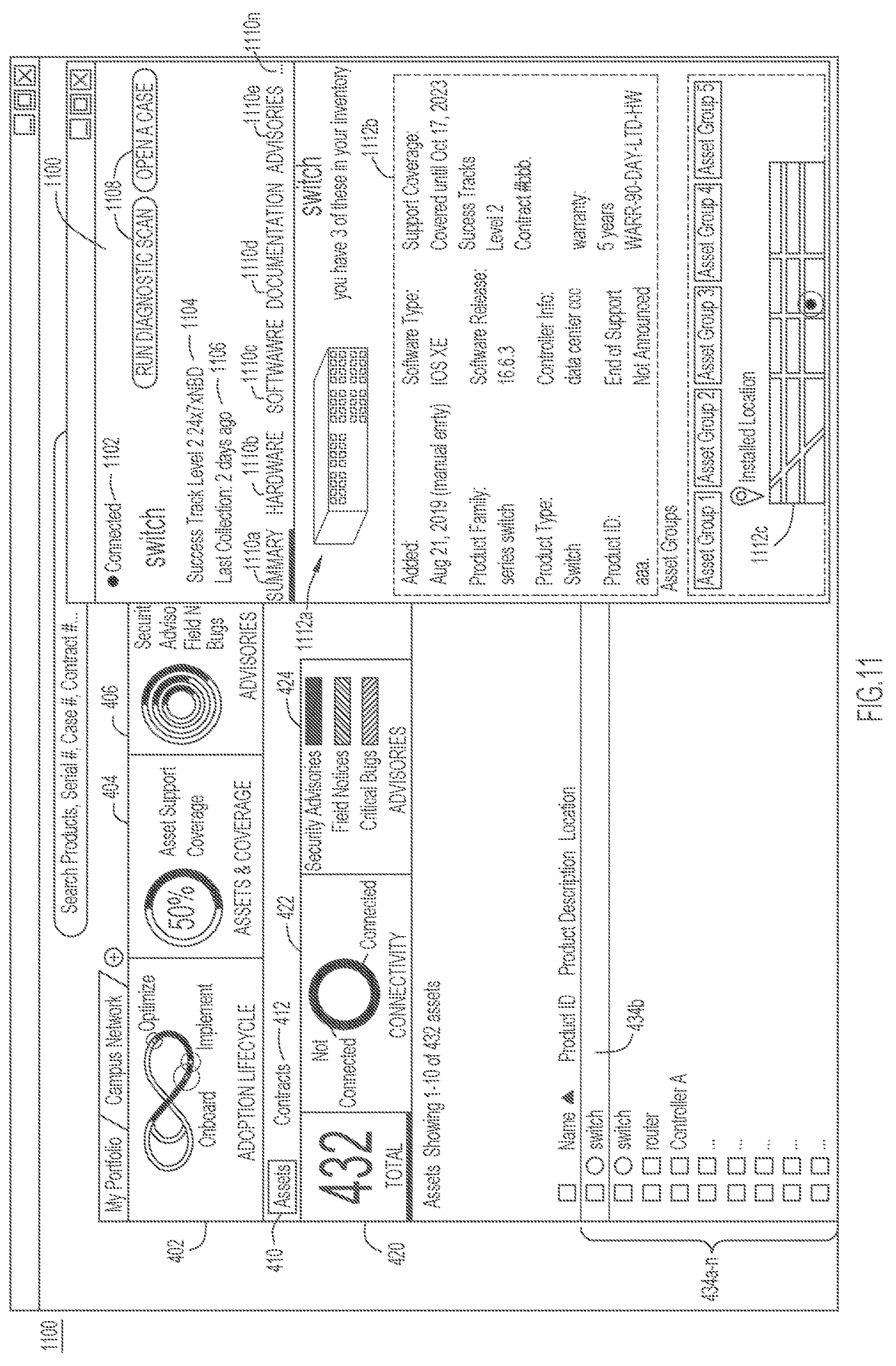

FIG. 11 is a screen shot illustrating an individual asset level view 1100 of contextualization, according to an example embodiment. By selecting one of the network resources 434a-n of FIG. 4, such as the switch 434b, the cloud portal 100 generates the individual asset level view 1100 in which information about the switch 434b is provided. The information is generated by threading data from multiple disparate sources.

The individual asset level view 1100 includes the status 1102 (connected, not connected, etc.), level or tier of support coverage applied to the asset 1104, and a time stamp 1106 (when the last telemetry data was collected). Individual asset tools 1108 provide for running a diagnostic scan on the switch 434b and/or opening a new case, for example, for troubleshooting a problem.

The individual asset level view 1100 may further provide specific information about the switch 434b, split into various portions or levels such as a summary portion 1110a, a hardware portion 1110b, a software portion 1110c, a documentation portion 1110d, an applicable advisories portion 1110e, and other portions 1110n.

The summary portion 1110a includes various information about this type of the asset such as the number 1112a of the switch 434b in the inventory (3) and image, and attributes 1112b, and grouping or location related information 1112c.

The attributes 1112b may include: when and how the switch 434b was discovered or added, the product family, the product type, the product identification, the software type, the software version (release), the connected devices information (controller information to which the switch 434b is connected), when coverage or support for the switch 434b expires, support coverage type, and other warranty and support related information.

The grouping or location related information 1112c may include installation locations of the switch 434b such as geographic locations, enterprise sites 110(1)— (N), asset groups and so on.

The cloud portal 100 threads various data from disparate sources to generate a holistic end-to-end view of the asset (the individual asset level view 1100) that includes its attributes, related objects, and correlations, thereby unlocking unique possibilities to proactively alert the enterprise to relevant insights and remediation opportunities. For instance, if an asset is missing a license (telemetry data) to enable purchased feature sets (purchase data), contextual help resources (product guides, e-learning, community forum posts) can be presented in-context to guide the customer on best practices for applying and enabling licenses for this asset. As another example, based on a degree of risk (determined by IC engines) associated with running an old version of software (obtained from the telemetry data), and based on the enabled feature sets on an asset such as a router (obtained from the telemetry data), a recommended version of software (IC engine) can be presented along with contextual help resources for how to perform the upgrade (product guides, e-learning) in accordance with best practices.

The techniques presented herein unify disparate cross-domain data including enterprise's behavior, product telemetry, enterprise network or IT data, and a knowledge base and generate holistic and contextualized digital representations of the enterprise IT environment. The techniques presented herein further thread the disparate cross-domain data to support targeted enterprise use cases to unlock and enable enterprise success of managing its IT environment.

Figure 12:
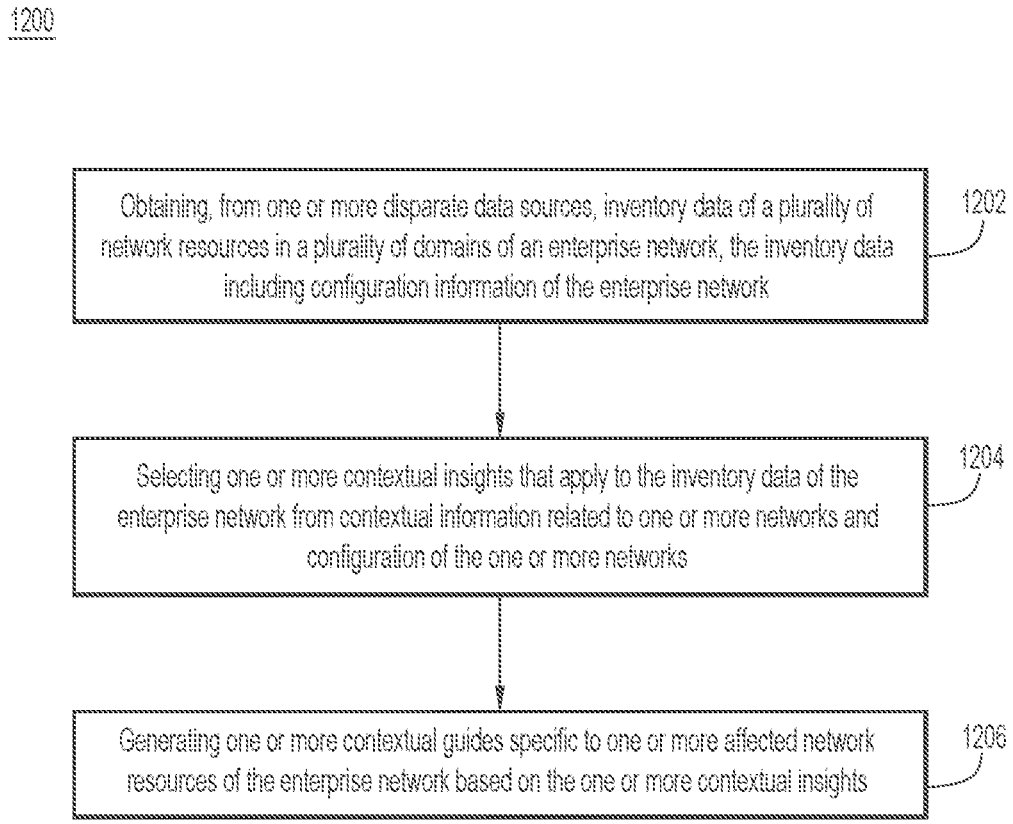
FIG. 12 is a flowchart illustrating a method of generating one or more contextual guides specific to one or more affected network resources of an enterprise, according to an example embodiment.

FIG. 12 is a flowchart illustrating a method 1200 of generating one or more contextual guides specific to one or more affected network resources of an enterprise, according to an example embodiment. The method 1200 may be implemented by a computing device such as a server or a group of servers that execute the cloud portal 100 of FIG. 1.

At 1202, the method 1200 involves obtaining, from one or more disparate data sources, inventory data of a plurality of network resources in a plurality of domains of an enterprise network. The inventory data includes configuration information of the enterprise network.

At 1204, the method 1200 involves selecting one or more contextual insights that apply to the inventory data of the enterprise network from contextual information related to one or more networks and configuration of the one or more networks.

At 1206, the method 1200 involves generating one or more contextual guides specific to one or more affected network resources of the enterprise network based on the one or more contextual insights.

In one form, the method 1200 may further involve changing a configuration of at least one of the one or more affected network resources based at least in part on the one or more contextual guides.

In another form, the method 1200 may further involve obtaining the contextual information that includes contextual alerts and/or product support information, from one or more knowledge databases that include: one or more advisory information systems, one or more community forums, one or more online libraries, one or more support case management platforms, one or more content management systems, and one or more product or service guides and documentation.

In the method 1200, the operation 1202 of obtaining the inventory data of the enterprise network may include aggregating the plurality of network resources deployed in the plurality of domains of the enterprise network into a unified inventory. The plurality of network resources including network devices and software services deployed in each of the plurality of domains. The operation 1202 of obtaining the inventory data of the enterprise network may further include obtaining configuration and feature related information for each of the plurality of network resources and software services.

According to one or more example embodiments, the operation 1202 of obtaining the inventory data of the enterprise network may include obtaining: telemetry data of the enterprise network, configuration data from a configuration management database of the enterprise network, service related information from a subscription system. The method 1200 may further involve analyzing the telemetry data, the configuration data, and the service related information, to generate the unified inventory of the enterprise network.

In the method 1200, the operation 1204 of selecting the one or more contextual insights from the contextual information may include determining a contextual data set from the contextual information that applies to one or more of the network devices and software services based on the service related information and the telemetry data and selecting the one or more contextual insights from the contextual data set that applies to the configuration and feature related information based on the telemetry data.

According to one or more example embodiments, selecting the one or more contextual insights may further include obtaining a use case, input by a network operator, where the use case is one of a risk analysis of the enterprise network, troubleshooting of the enterprise network, and a configuration update of the enterprise network, and selecting the one or more contextual insights from the contextual data set that applies to the use case.

In the method 1200, the operation 1206 of generating the one or more contextual guides may include generating one or more security alerts related to the one or more affected network resources and one or more potentially affected network resources of the enterprise network. The one or more security alerts may include identification, location, and configuration information for each network resource indicated in the one or more security alerts.

In one form, the operation 1206 of generating the one or more contextual guides may include generating a support guide related to configuring the one or more affected network resources and that includes identification, location, and feature-related information for each network resources indicated in the support guide.

In another form, the operation 1206 of generating the one or more contextual guides may further be based on an access level of an operator and may be applicable to at least two network resources from different domains of the enterprise network.

In one instance, the operation 1204 of selecting one or more contextual insights may include collecting telemetry data of a resource of the plurality of network resources deployed in the enterprise network, determining a particular stage, from a plurality of stages in an adoption lifecycle journey of the resource, based on the telemetry data, and selecting the one or more contextual insights that apply to the particular stage.

Figure 13:
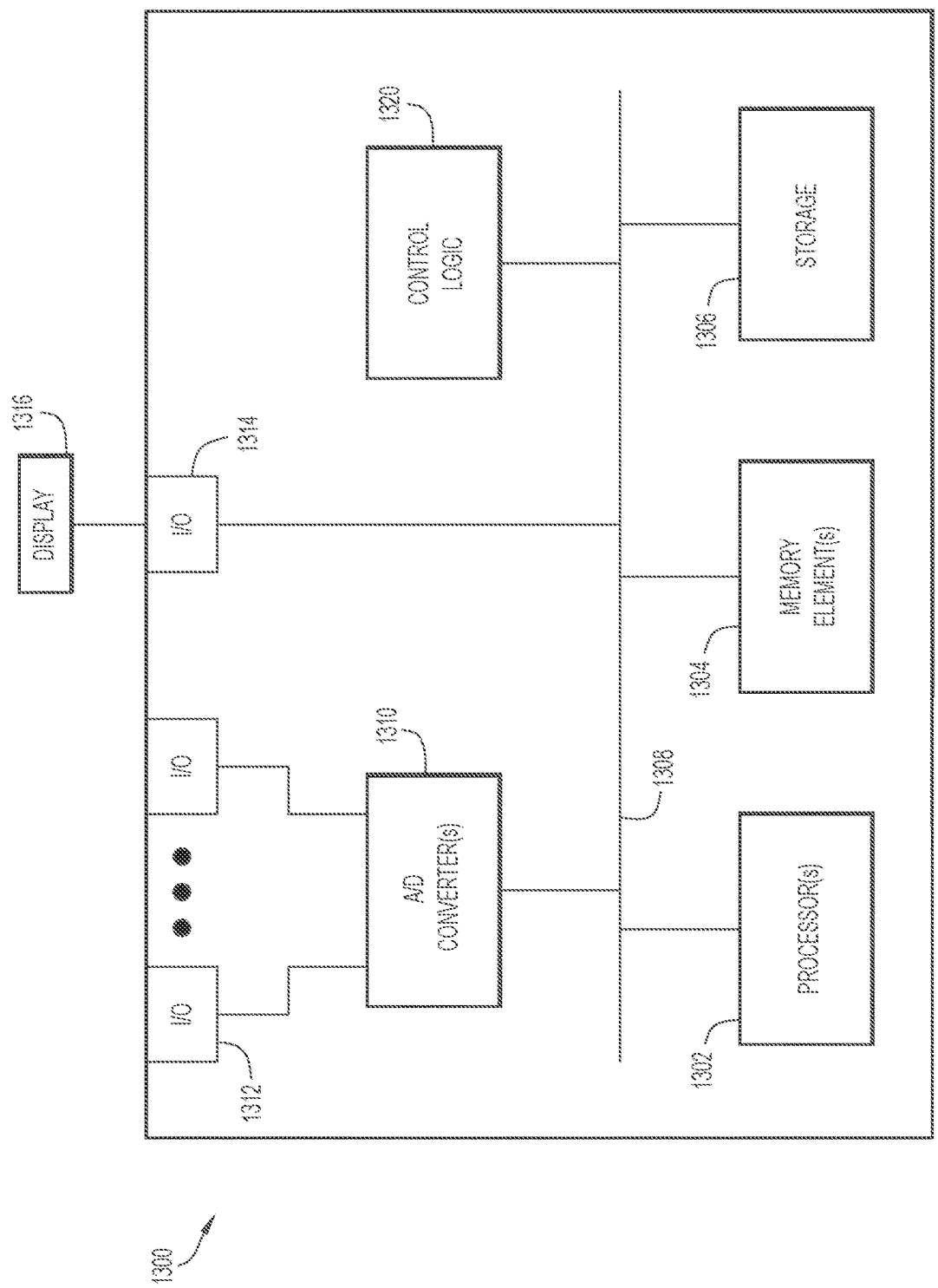
FIG. 13 is a hardware block diagram of a computing device that may perform functions associated with any combination of operations in connection with the techniques depicted and described in FIGS. 1-12.

FIG. 13 is a hardware block diagram of a computing device 1300 that may perform functions associated with any combination of operations in connection with the techniques depicted and described in FIGS. 1-12, including, but not limited to, operations of the computing device or one or more servers that execute the cloud portal 100. Further, the computing device 1300 may be representative of one of the network devices. It should be appreciated that FIG. 13 provides only an illustration of one embodiment and does not imply any limitations with regard to the environments in which different embodiments may be implemented. Many modifications to the depicted environment may be made.

In at least one embodiment, computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with one or more memory elements 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to the computing device 1300. For example, I/O interface(s) 1314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 1316, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as the computing device executing the cloud portal 100 of FIG. 1. The apparatus includes a memory, a network interface configured to enable network communications, and a processor. The processor is configured to perform various operations. The operations include obtaining, from one or more disparate data sources, inventory data of a plurality of network resources in a plurality of domains of an enterprise network. The inventory data includes configuration information of the enterprise network. The operations further include selecting one or more contextual insights that apply to the inventory data of the enterprise network from contextual information related to one or more networks and configuration of the one or more networks and generating one or more contextual guides specific to one or more affected network resources of the enterprise network based on the one or more contextual insights.

In yet another example embodiment, one or more non-transitory computer readable storage media encoded with instructions are provided. When the media is executed by a processor, the instructions cause the processor to execute a method involving obtaining, from one or more disparate data sources, inventory data of a plurality of network resources in a plurality of domains of an enterprise network. The inventory data includes configuration information of the enterprise network. The method further involves selecting one or more contextual insights that apply to the inventory data of the enterprise network from contextual information related to one or more networks and configuration of the one or more networks and generating one or more contextual guides specific to one or more affected network resources of the enterprise network based on the one or more contextual insights.

In yet another example embodiment, a system is provided that includes the devices and operations explained above with reference to FIGS. 1-13.

The programs described herein (e.g., control logic 1320) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1306 and/or memory elements(s) 1304 can store data, software, code, instructions (e.g., processor instructions), logic, parameters, combinations thereof, and/or the like used for operations described herein. This includes the storage 1306 and/or memory elements(s) 1304 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11

(e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a computing device from one or more disparate data sources, inventory data of a plurality of network resources in a plurality of domains of an enterprise network, the inventory data including configuration information of the enterprise network;
    collecting resource information about a network resource of the plurality of network resources deployed in the enterprise network;
    selecting one or more contextual insights that apply to the inventory data of the enterprise network from contextual information related to one or more networks and configuration of the one or more networks based on the resource information, wherein the one or more contextual insights are support material including one or more of contextual alerts and product support information obtained from a knowledge database; and
    generating one or more contextual guides specific to one or more affected network resources of the enterprise network based on the one or more contextual insights.

2. The method of claim 1, further comprising:
    changing, by the computing device, a configuration of at least one of the one or more affected network resources based at least in part on the one or more contextual guides.

3. The method of claim 1, further comprising:
generating a unified inventory view of the enterprise network based on the inventory data and the resource information, the unified inventory view includes state and configuration data of the plurality of network resources including a plurality of network devices and a plurality of software services deployed in each of the plurality of domains of the enterprise network.

4. The method of claim 1, further comprising:
obtaining a selection of a use case for the enterprise network; and
generating a specialized inventory view of the enterprise network that is specific to the use case based on the inventory data and the resource information, the specialized inventory view includes state and configuration of a selected set of the plurality of network resources that relates to a selected use case including a plurality of network devices and a plurality of software services deployed in each of the plurality of domains of the enterprise network.

5. The method of claim 1, wherein collecting the resource information includes:
determining one or more configuration of the network resource using machine learning.

6. The method of claim 1, further comprising:
obtaining the contextual information that includes the contextual alerts and/or the product support information stored in one or more knowledge databases that include:
one or more advisory information systems,
one or more community forums,
one or more online libraries,
one or more support case management platforms,
one or more content management systems, and
one or more product or service guides and documentation.

7. The method of claim 1, wherein obtaining the inventory data of the enterprise network includes:
aggregating the plurality of network resources deployed in the plurality of domains of the enterprise network into a unified inventory, the plurality of network resources including a plurality of network devices and a plurality of software services deployed in each of the plurality of domains; and
obtaining configuration and feature related information for each of the plurality of network devices and the plurality of software services.

8. The method of claim 7, wherein obtaining the inventory data of the enterprise network further includes obtaining:
telemetry data of the enterprise network,
configuration data from a configuration management database of the enterprise network, and service related information from a subscription system, and
the method further comprising:
analyzing the telemetry data, the configuration data, and the service related information, to generate the unified inventory of the enterprise network.

9. The method of claim 1, wherein generating the one or more contextual guides includes:
generating one or more security alerts related to the one or more affected network resources and one or more potentially affected network resources of the enterprise network, wherein the one or more security alerts include identification, location, and the configuration information for each network resource indicated in the one or more security alerts.

10. The method of claim 1, wherein generating the one or more contextual guides includes:

generating a support guide related to configuring the one or more affected network resources and that includes identification, location, and feature-related information for each network resource indicated in the support guide.

11. The method of claim 1, wherein generating the one or more contextual guides is further based on an access level of an operator and applies to at least two network resources from different domains of the enterprise network.

12. An apparatus comprising:
a memory;
a network interface configured to enable network communications; and
a processor, wherein the processor is configured to perform operations comprising:
obtaining, from one or more disparate data sources, inventory data of a plurality of network resources in a plurality of domains of an enterprise network, the inventory data including configuration information of the enterprise network;
collecting resource information about a network resource of the plurality of network resources deployed in the enterprise network;
selecting one or more contextual insights that apply to the inventory data of the enterprise network from contextual information related to one or more networks and configuration of the one or more networks based on the resource information, wherein the one or more contextual insights are support material including one or more of contextual alerts and product support information obtained from a knowledge database; and
generating one or more contextual guides specific to one or more affected network resources of the enterprise network based on the one or more contextual insights.

13. The apparatus of claim 12, wherein the processor is further configured to perform:
changing a configuration of at least one of the one or more affected network resources based at least in part on the one or more contextual guides.

14. The apparatus of claim 12, wherein the processor is further configured to perform:
generating a unified inventory view of the enterprise network based on the inventory data and the resource information, the unified inventory view includes state and configuration data of the plurality of network resources including a plurality of network devices and a plurality of software services deployed in each of the plurality of domains of the enterprise network.

15. The apparatus of claim 12, wherein the processor is further configured to perform:
obtaining a selection of a use case for the enterprise network; and
generating a specialized inventory view of the enterprise network that is specific to the use case based on the inventory data and the resource information, the specialized inventory view includes state and configuration of a selected set of the plurality of network resources that relates to a selected use case including a plurality of network devices and a plurality of software services deployed in each of the plurality of domains of the enterprise network.

16. The apparatus of claim 12, wherein the processor is configured to collect the resource information by:
determining one or more configuration of the network resource using machine learning.

17. The apparatus of claim 12, wherein the processor is further configured to perform:
 obtaining the contextual information that includes contextual alerts and/or product support information, from one or more knowledge databases that include:
  one or more advisory information systems,
  one or more community forums,
  one or more online libraries,
  one or more support case management platforms,
  one or more content management systems, and
  one or more product or service guides and documentation.

18. One or more non-transitory computer readable storage media encoded with instructions that, when executed by a processor, cause the processor to execute a method comprising:
 obtaining, from one or more disparate data sources, inventory data of a plurality of network resources in a plurality of domains of an enterprise network, the inventory data including configuration information of the enterprise network;
 collecting resource information about a network resource of the plurality of network resources deployed in the enterprise network;
 selecting one or more contextual insights that apply to the inventory data of the enterprise network from contextual information related to one or more networks and configuration of the one or more networks based on the resource information, wherein the one or more contextual insights are support material including one or more of contextual alerts and product support information obtained from a knowledge database; and
 generating one or more contextual guides specific to one or more affected network resources of the enterprise network based on the one or more contextual insights.

19. The one or more non-transitory computer readable storage media of claim 18, wherein the method further comprises:
 changing a configuration of at least one of the one or more affected network resources based at least in part on the one or more contextual guides.

20. The one or more non-transitory computer readable storage media of claim 18, wherein the method further comprises:
 generating a unified inventory view of the enterprise network based on the inventory data and the resource information, the unified inventory view includes state and configuration data of the plurality of network resources including a plurality of network devices and a plurality of software services deployed in each of the plurality of domains of the enterprise network.

* * * * *